M. R. NYIK.
AUTOMOBILE BRAKE.
APPLICATION FILED APR. 27, 1914.
1,118,233.
Patented Nov. 24, 1914.
2 SHEETS—SHEET 1.
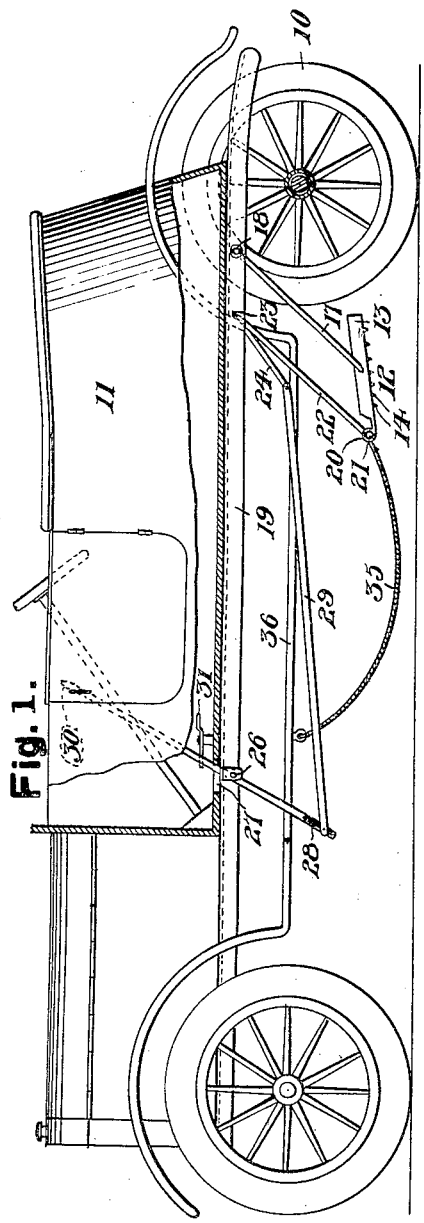
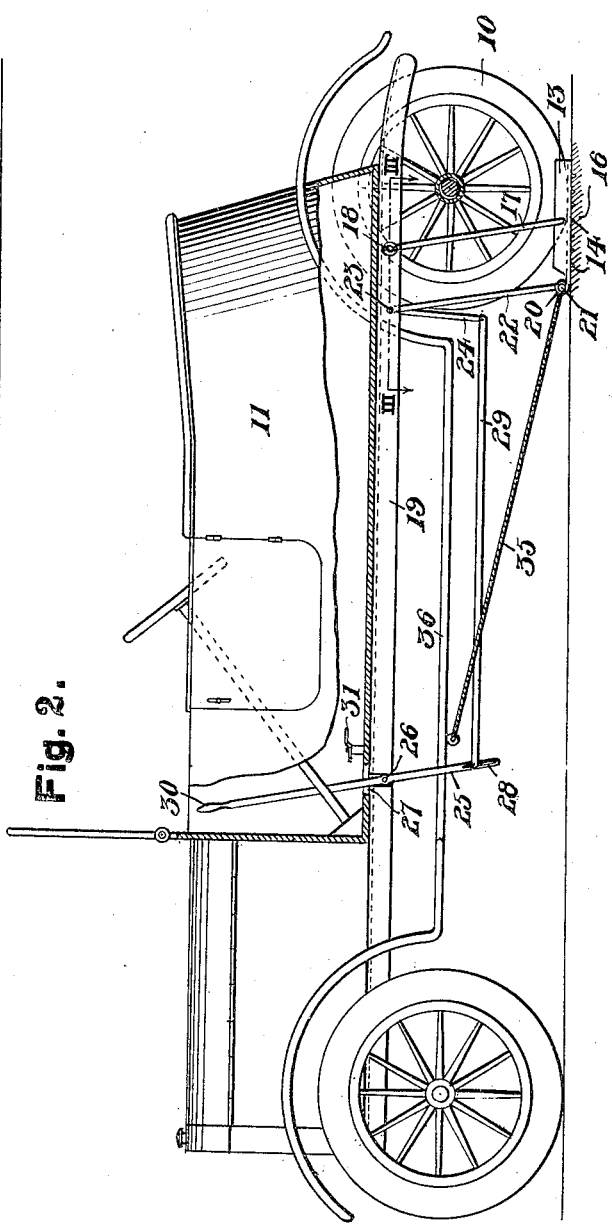

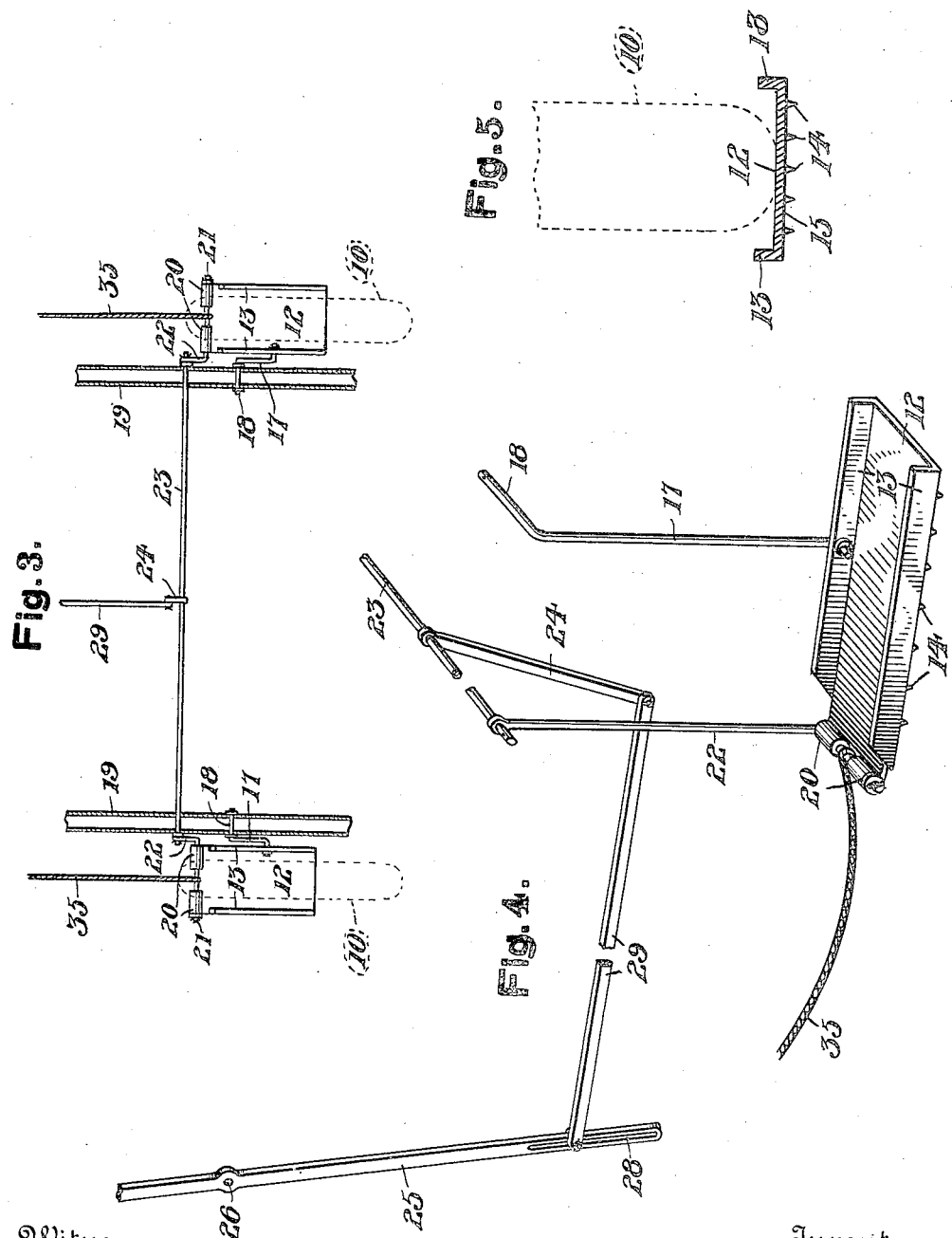

UNITED STATES PATENT OFFICE.

MIKE RINYIK, OF VINTONDALE, PENNSYLVANIA.

AUTOMOBILE-BRAKE.

1,118,233.  Specification of Letters Patent.  Patented Nov. 24, 1914.

Application filed April 27, 1914. Serial No. 834,684.

*To all whom it may concern:*

Be it known that I, MIKE RINYIK, a subject of the Emperor of Austria-Hungary, residing at Vintondale, in the county of Cambria and State of Pennsylvania, have invented certain new and useful Improvements in Automobile-Brakes, of which the following is a specification.

This invention relates to new and useful improvements in automobile brakes.

The primary object of this invention is the provision of brake shoes swingingly carried adjacent the rear wheels of an automobile and adapted for positioning therebeneath by operating means controlled from the driver's seat.

A further object is the provision of an efficient brake device in the form of a ground engaging shoe adapted for supporting one of the automobile wheels when positioned therebeneath and resulting in an interruption in the road-bed contact of the wheel.

A still further object is to provide a spiked brake shoe swingingly mounted for movement from the driver's seat to receive a traction wheel thereon resulting in an engagement of the shoe spikes with the road-bed for braking purposes.

With these general objects in view and others that will appear as the nature of the invention is better understood, the same consists in the novel combination and arrangement of parts hereinafter fully described, illustrated in the accompanying drawings and pointed out in the appended claim.

In the drawings forming a part of this application and in which like designating characters refer to corresponding parts throughout the several views:—Figure 1 is a side elevation of an automobile provided with the present invention illustrated in its inoperative elevated position, portions of the automobile being broken away. Fig. 2 is a similar view illustrating the brake shoes in their operative lowered positions. Fig. 3 is a sectional view taken upon line III—III of Fig. 2 transversely of the automobile and looking in the direction of the arrows. Fig. 4 is a perspective view of one of the brake shoes and its adjacent operating means detached from the automobile, and Fig. 5 is a transverse sectional view of one of the brake shoes, a portion of a wheel being illustrated in dotted lines as positioned thereon.

Referring more in detail to the drawings, the invention broadly consists in providing the rear wheels 10 of the automobile 11 with brake shoes 12 positionable thereunder and provided with opposite side flanges 13 for receiving the wheel therebetween and with projecting spikes or calks 14 carried by its lower surface 15 and adapted to engage the road-bed illustrated at 16.

It is designed to provide a separate brake shoe for each of the rear wheels with each of the said shoes suspended and operated in a similar manner and adapted for simultaneous actuation.

The inner flange of each of the brake shoes is provided with a supporting rod 17 pivoted thereto substantially midway of its length while an angular extension 18 at the upper end of the rod is journaled through suitable openings in the side rail 19 of the automobile frame. The forward end of the shoe is provided with spaced cylindrical lugs 20 having the angular lower end 21 of a bar 22 journaled therein while the upper end of said bar is rigidly secured to a turn shaft 23.

With the two brake shoes 12 swingingly suspended upon the supporting rod 17 and bar 22 forwardly of the rear wheels 10, it will be seen that by imparting movement to the turn shaft 23 through the agency of a lever 24 rigidly mounted thereon, the shoes may be positioned as desired either elevated or lowered as shown respectively in Figs. 1 and 2 of the drawings or in any intermediate positions.

A hand operating lever 25 is pivoted as at 26 in an opening 27 through the bottom of the automobile and has its lower slotted end 28 pivotally connected by a link 29 to the lower end of the lever 24 and whereby the operator positioned upon the seat of the automobile may impart the desired turning movement to the turn shaft 23 by a manipulation of the lever 25 by grasping the handle 30 thereof. A cord or any flexible connector 35 is secured at one end to the running board 36 of the automobile and at its other end to the angular portion 21 of the bar 22 at a point between the spaced tubular lugs 20 and whereby the rearward movement of the brake shoe is limited as desired and preferably limited in its movement to a position substantially in vertical alinement beneath the rear axle of the automobile, it being of course understood that each brake shoe is provided with a separate flexible limiting means 35.

The complete operation of the device will now be apparent. With the brake shoes positioned elevated as illustrated in Fig. 1, it is only necessary for the operator to release the hook latch 31 from the lever 25, when the brake shoes by their own weight will rearwardly swing downwardly beneath the rear wheels thus positioning the brake shoes operatively for contacting the road-bed with the said wheels supported upon the shoes. If desired, the latch 31 may be released and the lever 25 forced forwardly for thus positioning the shoes.

When desired to release the brakes, the automobile is propelled backward off of the brake shoes and the lever 25 pulled rearwardly which elevates the brake shoes to their inoperative positions where they are retained by again hooking the latch 31 over said lever 25.

While the forms of the invention herein shown and described are what are believed to be preferable embodiments thereof, it is nevertheless to be understood that minor changes may be made in the form, proportion and details of construction without departing from the spirit and scope of the invention as set forth in the appended claim.

What I claim as new is:—

A brake device comprising in combination with an automobile, a brakeshoe for each rear wheel thereof, upwardly projecting side flanges upon each of said shoes and adapted for seating the adjacent rear wheel therebetween, angular rods pivoted between the inner flanges of said shoes and the adjacent side rails of the automobile, tubular spaced lugs carried at the front of each of said shoes, a shaft journaled transversely of the automobile frame, bars rigidly secured to said shaft and having outward lower angular ends extending through said lugs, and means for operating said shaft.

In testimony whereof I affix my signature in presence of two witnesses.

MIKE RINYIK.

Witnesses:
JOHN KEAYNYAK,
MIKE LOIVES.

Copies of this patent may be obtained for five cents each, by addressing the "Commissioner of Patents, Washington, D. C."